United States Patent [19]

Messerschmidt et al.

[11] Patent Number: 5,077,827
[45] Date of Patent: Dec. 31, 1991

[54] WARNING RECEIVER READINESS MONITORING CIRCUIT

[75] Inventors: Rudolf Messerschmidt, Sibbesse; Gerolf Schlabe, Hildesheim, both of Fed. Rep. of Germany

[73] Assignee: Blaupunkt-Werke GmbH, Hildesheim, Fed. Rep. of Germany

[21] Appl. No.: 469,335

[22] Filed: Jan. 24, 1990

[30] Foreign Application Priority Data

Mar. 3, 1989 [DE] Fed. Rep. of Germany ....... 3906780

[51] Int. Cl.$^5$ .................... H04B 1/00; H04B 17/00
[52] U.S. Cl. ......................................... 455/1; 455/45; 455/166
[58] Field of Search .................. 455/1, 45, 32, 36, 37, 455/45, 67, 62, 161, 164, 166; 340/825.44

[56] References Cited

U.S. PATENT DOCUMENTS

| | | |
|---|---|---|
| 3,568,065 | 3/1971 | Pagany et al. . |
| 3,949,401 | 4/1976 | Hegeler . |
| 4,434,504 | 2/1984 | Fredrickson ........................ 455/166 |
| 4,435,843 | 3/1984 | Eilers et al. . |
| 4,450,589 | 5/1984 | Eilers et al. . |
| 4,476,573 | 10/1984 | Duckeck ............................... 455/45 |
| 4,476,581 | 10/1984 | Bragas .................................. 455/166 |
| 4,499,603 | 2/1985 | Eilers . |
| 4,862,513 | 8/1989 | Brägas . |

Primary Examiner—Reinhard J. Eisenzopf
Assistant Examiner—Lisa Charouel
Attorney, Agent, or Firm—Frishauf, Holtz, Goodman & Woodward

[57] ABSTRACT

A warning radio receiver is adapted to receive not only a recognition signal for emergency broadcast but also two further recognition signals, namely a warning network transmitter recognition signal and a warning region recognition signal. If, for example, the currently tuned transmitter changes its warning region recognition signal, after the expiration of the timing period of a first timer 16, one or more seeking operations for other transmitters with the predetermined warning region recognition signal are started. If a predetermined number of such seeking operations remain unsuccessful, the reception readiness of the transmitter is demonstrated by switchover to a transmitter associated with a different warning region. If such other transmitters also cannot be found, exceeding another predetermined number of fruitless seeking operations results in the generation of a receiver malfunction indication.

6 Claims, 1 Drawing Sheet

WARNING RECEIVER READINESS MONITORING CIRCUIT

Cross Reference to related U.S. patents, the disclosures of which are hereby incorporated by reference: U.S. Pat. No. 3,568,065, PAGANY; U.S. Pat. No. 3,949,401, HEGELER; U.S. Pat. No. 4,435,843 and U.S. Pat. No. 4,450,589, EILERS & BRAGAS; U.S. Pat. No. 4,499,603, EILERS (corresponding to German DE-OS 32 11 813); U.S. Pat. No. 4,862,513.

Cross-reference to related literature: European Broadcasting Union Technical Standard 3244-E (60 pages, EBU Technical Centre, Brussels, Belgium, March 1984).

FIELD OF THE INVENTION

The present invention relates generally to radio receivers having decoders for region recognition signals and announcement recognition signals and, more particularly, to such a receiver with a transmitter-seeking circuit and means for indicating lack of success after a predetermined number of such seeking operations.

BACKGROUND

German Patent DE-PS 32 11 813 and corresponding U.S. Pat. No. 4,499,603, EILERS, disclose a radio receiver which does not merely wait for the transmission of a warning message and its associated recognition signal on an auxiliary carrier, but rather also monitors for reception of a recognition signal for interrupting traffic announcements and, upon receipt of this recognition signal, resets a timer switch or other timing element to zero. If the timer switch is not reset to zero during a 24-hour period, an error indication is generated.

That apparatus is based upon the assumption that traffic announcements will be broadcast a plurality of times each day. As long as the timer switch is reset to zero by the recognition signals of the traffic announcements, the warning receiver remains ready to receive any warning message, even though it is characterized by some other recognition signal, such as the signals used only in emergencies.

The dead time of the apparatus is 24 hours. This known receiver is not adapted to process other recognition signals. This known receiver has the disadvantage that it is impossible to distinguish whether the receiver is malfunctioning or has merely, by some chance, not received any traffic announcements within the preceeding 24 hours.

THE INVENTION

It is an object of the present invention to provide a radio receiver which reacts to other recognition signals, has practically no dead time and which assures unambiguous recognition of a malfunctioning receiver.

Briefly, this is accomplished by incorporating a transmitter-seeking circuit which sends a pulse to a pulse counter each time a seeking operation is performed. It is then possible to determine whether the number of unsuccessful seeking operations performed within a predetermined period of time has exceeded a predetermined number of attempts and, if so, to provide a malfunction indication. Preferably, this is accomplished using a coincidence circuit and a read-only memory which contains thee maximum number of attempts, and by providing a manual reset of the malfunction indicator.

DRAWING

FIG. 1 is a schematic block diagram of a preferred embodiment of the readiness monitoring circuit of the present invention.

DETAILED DESCRIPTION

Figure 1:
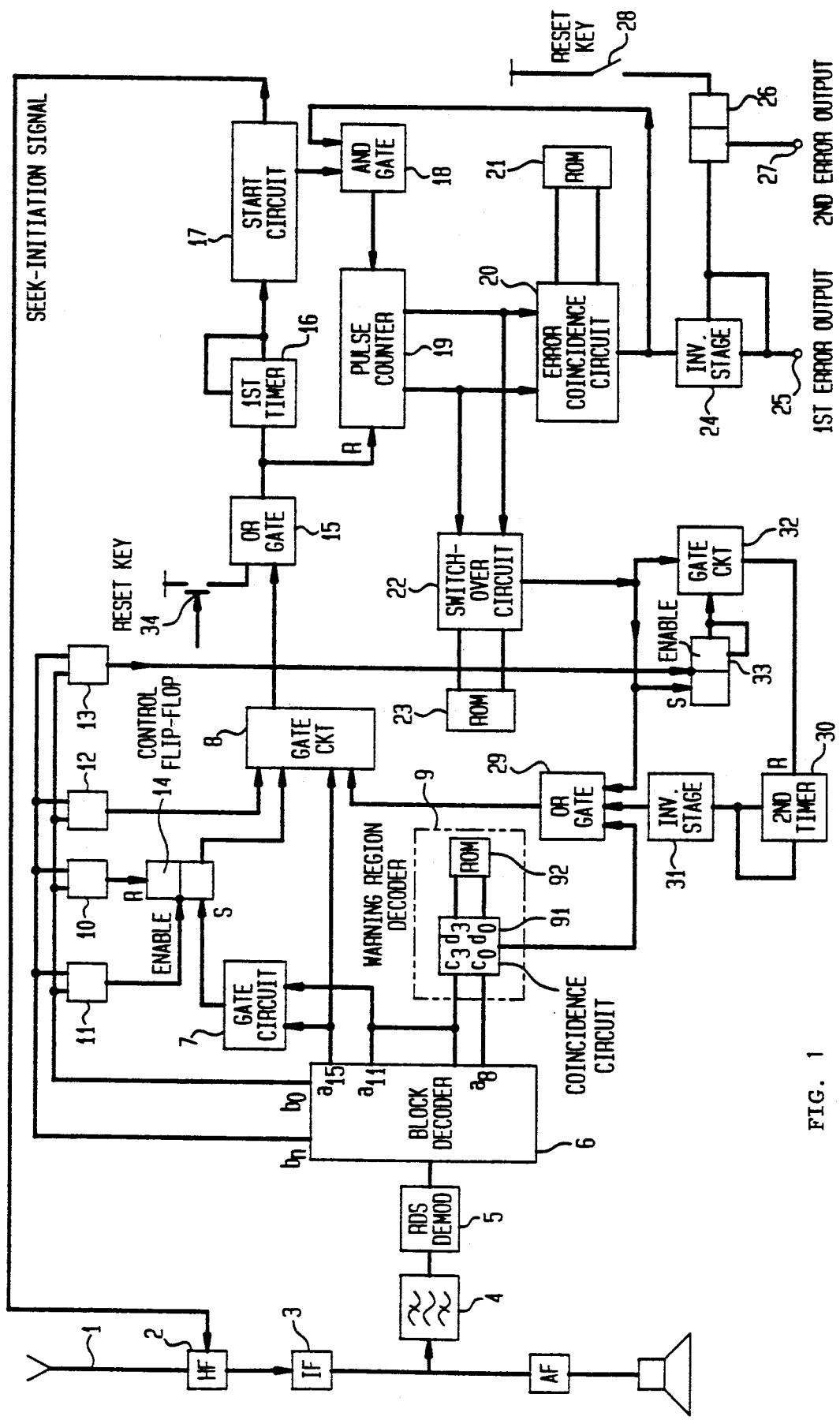

In the preferred embodiment, the circuit of the present invention is connected downstream of a conventional FM (Frequency Modulation) receiver, also known in Germany as "UKW" receiver. An antenna 1 carries a signal to a conventional high-frequency or tuner stage 2 which is set to any desired frequency. An IF (Intermediate Frequency) stage 3 separates the carrier frequency and the signals modulated onto the carrier. The output of IF stage 3 supplies the usual multiplex signal containing all the information. The output of IF stage 3 is connected to an audio-frequency output stage, which is in turn connected to a speaker, and to a filter 4 which separates from the multiplex signal the signal components in the neighborhood of the auxiliary carrier frequency, such as the 57 kiloHertz (kHz) frequency used in Germany and elsewhere. The aforementioned audio-frequency stage renders audible both the normal radio program content and the warning announcements from the selected transmitter. If the selected transmitter belongs to the network of warning transmitters, the output of filter 4 will provide a signal corresponding to the amplitude-modulated 57 kiloHertz auxiliary carrier, which is itself suppressed during transmission. This signal is part of the RDS (Radio Data System) network, whose specifications are set forth in European Broadcasting Union Technical Standard 3244-E (60 pages, EBU Technical Centre, Brussels, Belgium, March 1984).

The output signal of FIG. 4 is fed to the input of an RDS demodulator 5, whose structure is disclosed in German Application DE-OS 37 09 523 and corresponding U.S. Pat. No. 4,862,513, issued Aug. 29, 1989. When tuner 2 is set to a warning network transmitter, the RDS demodulator 5 generates a continuous stream of digital data in which specific data blocks which, for example, identify the transmitter, are repeated more or less often and other data blocks are contained only once.

The output data stream from demodulator 5 is fed to the input of a block decoder 6 which is known per se. Block decoder 6 corrects any errors which may have crept into the signal on the transmission path and then decodes the data groups.

The information words in the data blocks are made available at the outputs of block decoder 6 as 16-bit-wide data words. Decoder 6 has a further output $b_o$ which supplies a block clock signal and a further output $b_n$ which provides a block number signal. Each four blocks belong to a data group, typically 104 bits long, whose type code is contained in block 2 and can be picked up at outputs $a_{11}$ through $a_{15}$ of block decoder 6. These outputs are connected to respective inputs of a gate circuit 7 which generates an output signal whenever there is applied, to its inputs, the type code of group 1A of the Radio Data System. As shown on page 16 of the aforementioned Standard 3244-E, group 1A appears once per second within the continuous data stream.

Output $a_{15}$ of block decoder 6 is further connected with a first input of a second gate circuit 8, while outputs $a_{11}$, $a_{10}$, $a_9$ and $a_8$ are respectively connected to four inputs $c_0$ through $c_3$ of a coincidence circuit 91 in a warning region decoder 9. Circuit 91 has a further four inputs $d_0$ through $d_3$ which are connected to a non-volatile memory 92, such as a Read-Only Memory (ROM) in which the warning region code is stored as a comparison word for use by circuit 91.

Outputs $b_0$ and $b_n$ of block decoder 6 are connected to inputs of each of four clocking gates 10 through 13. Gate 10 provides a clock pulse associated with the first block of the RDS signal, gate 11 supplies a clock pulse associated with the second block, gate 12 supplies a clock pulse associated with the third block, and gate 13 supplies a clock pulse associated with the fourth block.

The clock pulse from gate 10 is applied to the RESET input of a control flip-flop 14, whose SET input is connected to the output of gate circuit 7. The output of gate 11 is connected to the enable input of control flip flop 14. The output of control flip-flop 14 is fed to a second input of second gate circuit 8. A third input of this gate circuit 8 is connected to the output of gate 12.

The output of gate circuit 8 is connected via an OR-gate 15 to the input of a first timer 16, whose output is fed to an input of a transmitter-seeking or scan-starting circuit 17, which controls tuner 2 to perform a seeking operation for another transmitter. Seeking circuits are well known in the art, for example from U.S. Pat. No. 3,568,065, PAGANY et al./BLAUPUNKT, issued Mar. 2, 1971.

An output of start circuit 17, which generates a pulse at the end of each transmitter-seeking cycle, is connected via AND-gate 18 with a pulse counter 19. The RESET input of pulse counter 19 is connected to the output of OR-gate 15 and thus is in parallel with the RESET input of first timer 16.

Pulse counter 19 has n outputs which are connected with a corresponding number of first inputs of an error coincidence circuit 20, which further has a corresponding number n of second inputs, which are connected to a non-volatile memory or ROM 21. The output of error coincidence circuit 20 is connected to the second input of AND-gate 18 and is further connected via an inverter stage 24 to a first error output 25. Parallel to this first error output 25 is connected the SET input of an error flip-flop 26, which has a second error output 27. A reset key 28 permits resetting error flip-flop 26.

A switchover coincidence circuit 22 is connected, in parallel to error coincidence circuit 20, to the n outputs of pulse counter 19. Switchover coincidence circuit 22 has further inputs which are connected to a non-volatile switchover memory ROM 23. The output of switchover coincidence circuit 22 is connected to a first input of an OR-gate 29. The second input of gate 29 is connected to the output of warning region decoder 9 and the third input of gate 29 is connected to the output of a second timer 30 via an inverter stage 31.

The output of switchover circuit 22 is connected to a gate circuit 32 and to the set input of a memory flip-flop 33. The enable input of flip-flop 33 is connected to the output of clocking gate 13. The outputs of flip-flop 33 and the switchover circuit 22 are connected to the inputs of gate circuit 32, whose output is connected to the RESET input of second timer 30.

A reset key 34 is connected to one input of OR-gate 15, whose output is connected to respective RESET inputs of both first timer 16 and pulse counter 19.

OPERATION

The circuit thus far described operates in the following manner: Upon receipt of each data block (typically 26 bits), block decoder 6 provides, at its outputs $b_o$ and $b_n$, regardless of which group the block is associated with, a clock signal and the associated block number, so that at each of clocking gates 10–13, clock pulses occur continuously one after another, independently of the data group which was just transmitted.

The gate 10 clock pulse, associated with the first block, always sets control flip-flop 14 back. When group number 1A then appears in the second block, the gate 11 clock pulse, associated with the second block, enables flip-flop 14 to receive the output signal of gate circuit 7 and pass it on to AND-gate 8.

Whenever the third block supplies, at output $a_{15}$, an evaluation bit to second gate circuit 8 and there is also information at outputs $a_8$ through $a_{15}$ of the block decoder, which information matches the region recognition code or ID stored in memory 92 of decoder 9, then the gate 12 clock signal, associated with the third block, resets first timer 16 by passing a signal from the output of gate 8 through OR-gate 15. The resetting of first timer 16 has the effect that its timing period restarts to run from zero.

The resetting of the time additionally means that the currently-tuned transmitter is a warning network transmitter which transmits warning announcements specifically intended for the warning region specified in decoder 9.

However, if there is no signal at the output of decoder 9, no signal from decoder 9 passes through OR-gate 29 to AND-gate 8, so that the clock pulse from gate 12 applied to another input of AND-gate 8 cannot pass through gate 8 and therefore cannot act as a reset pulse to first timer 16. Thus, the running of the period in timer 16 is not interrupted. The expiration of the timing period of timer 16 generates at its output a signal which triggers start circuit 17 to, in turn, trigger a transmitter-seeking operation in tuner 2.

The output of first timer 16 is fed back to the stop signal input of timer 16, so that the timer is stopped upon initiation of such a seeking operation. The thus-generated SEEK-condition of start circuit 17 is maintained until a RESET pulse again appears at the input of timer 16 and this state can therefore endure through a large number of such seeking operations.

If, during a seeking cycle, no other warning network transmitter associated with the warning region is found, decoder 9 generates no output signal, gate 8 remains blocked and the seeking cycle is repeated until pulse counter 19 reaches the predetermined number stored in switchover ROM 23.

In the subsequent next seeking cycle, the seek or scan is stopped at the instant whenever the transmitter found provides an evaluation bit associated with the third block of data group 1A at output $A_{15}$ of block decoder 16, i.e. regardless of whether region decoder 9 recognizes the region recognition signal. Thus, the reception readiness or proper functioning of the warning receiver is demonstrated, even when no transmitter which is responsible for its warning region can be found.

This evidence of the reception readiness of the warning receiver is accomplished by the switchover circuit 22, which generates an output signal upon reaching the predetermined number of unsuccessful seeking cycles. This output signal of circuit 22 passes through OR-gate 29 and is applied to gate circuit 8, thereby substituting for the non-existent output signal of warning region decoder 9. Once the output signal from switchover circuit 22 unblocks AND-gate 8, the next clock pulse from gate 12 triggers the resetting of timer 16.

If, after these seeking operations for warning network transmitters associated with other warning regions, none are found, start circuit 17 remains ON and pulse counter 19 receives further pulses until a predetermined number stored in memory 21 of error coincidence circuit 20 is reached. At that point, circuit 20, which is connected to memory 21 and to the output of pulse counter 13, sends a signal to AND-gate 8 which blocks the input to the pulse counter and simultaneously generates an error indication signal at error output 25. The error condition can be stored in error memory or flip-flop 26.

If an error or malfunction is indicated, then, after resolution of the malfunction, the reception readiness must be restored by pressing RESET key 34. This sends a RESET signal through OR-gate 15 to timer 16. This RESET impulse is, however, simultaneously applied to the RESET input of pulse counter 19, so that it is reset to zero. Thus, for both coincidence circuits 20 and 22, the agreement between the counter state and the stored fixed values is destroyed and both circuits cease to supply output signals. This restores the previous output state of the circuit as described above.

If, in the course of the previously-described operating cycle, a transmitter associated with a different warning region is tuned, the receipt of its signal immediately effects a resetting of the receiver to with—recognition—signal-only mode, i.e. for the reception of a transmitter associated with the warning region stored in memory 92. However, the other transmitter has only been tuned after multiple fruitless searches for a warning network transmitter associated with the stored warning region. Therefore, the tuning of the other transmitter should not be too quickly abandoned.

For this purpose, second timer 30 is provided. Timer 30 is activated over its RESET input when the signal appears at the output of switchover circuit 22 and after occurence of the next clock pulse from clocking gate 13, which is associated with the fourth block of the RDS signal. During the timing period of second timer 30, the output of timer 30 passes through inverter stage 31 so that the output signal of OR-gate 29 applied to gate 8 remains high, gate 8 is open and every clock pulse from gate 12 passes through and RESETS first timer 16.

Various changes and modifications are possible within the scope of the inventive concept.

A suitable RDS demodulator is disclosed in U.S. Pat. No. 4,862,513.

A suitable block decoder 6 is model RDS-Hybrid 8.638.309.234 marketed by Blaupunkt.

A suitable start circuit 17 is part of tuner marketed by Blaupunkt.

A suitable pulse counter 19 is model MC 14020B marketed by Motorola.

Suitable gate circuits 7, 8, 10-13, 15, 18, 29, 32 are respectively models MC 14082B, MC 14075B marketed by Motorola.

Suitable timers 16 and 30 are model MC 14528B marketed by Motorola.

Suitable coincidence circuits 91, 20 and 22 are model 7485 marketed by Texas Instruments.

Suitable memories 92, 21, 23 are model 6309 marketed by MMI.

Suitable flip-flops 14, 26, 33 are model 14013 marketed by Motorola.

We claim:

1. Readiness monitoring circuit, in combination with a warning radio receiver adapted to receive a primary carrier and an auxiliary carrier, said warning radio receiver having
    a tuner (2);
    a decoder (5), connected to an output of said tuner, for recognition signals modulated on said auxiliary carrier;
    a timer (16) having a reset input connected (6, 8, 15) to an output of said decoder (5); and
    means (25-28), responsive to expiration of a timing period of said timer (16), for indicating malfunction or error in said receiver,
    comprising, in accordance with the invention,
    a circuit (17), connected to an output of said timer (16), for starting a seeking operation in said tuner (2) for a transmitter operating at a different frequency and for generating an output signal indicating whether said seeking operation was successful; and
    counter means (19), connected to an output of said circuit (17), and responsive to a predetermined number of said output signals of said starting circuit (17), for actuating said malfunction indicating means (25-28) when said predetermined number has been exceeded.

2. Circuit according to claim 1, further comprising
    an error coincidence circuit (20) connected to an output of said counter means (19);
    non-volatile memory means (21) connected to an input of said error coincidence circuit (20); and
    a manually resettable memory (26) forming a part of said malfunction indicating means (25-28), and
    wherein said malfunction indicating means (25-28) is connected to an output of said error coincidence circuit (20).

3. Circuit according to claim 1, further comprising
    means (9, 22, 29), responsive to a predetermined number of unsuccessful seeking operations for a transmitter with a predetermined (92) recognition signal, for tuning said receiver to a transmission without such recognition signal; and
    means (32, 33), responsive to reception of signals representing said transmission without recognition signal, for resetting said receiver to with-recognition-signal-only mode.

4. Circuit according to claim 2, further comprising
    means (9, 22, 29), responsive to a predetermined number of unsuccessful seeking operations for a transmitter with a predetermined (92) recognition signal, for tuning said receiver to a transmission without such recognition signal; and
    means (32, 33), responsive to reception of signals representing said transmission without recognition signal, for resetting said receiver to with-recognition-signal-only mode.

5. Circuit according to claim 4, wherein
    said timer (16) and said counter means (19) each have a reset input, connected in parallel to each other,
    outputs of said counter means (19) are connected to respective first inputs of a switchover coincidence circuit (22) and further comprising;

a switchover memory (23), having outputs connected to respective second inputs of said switchover coincidence circuit (22);

an OR-gate (29), having inputs connected to respective outputs of said decoder (9) and of said switchover coincidence circuit (22), and an output connected (8) to said reset inputs of said timer (16) and of said counter means (19).

6. Circuit according to claim 5, further comprising a second timer (30) for maintaining, for a predetermined period, tuning to said transmission without recognition signal, and having an output connected to a further input of said OR-gate (29).

* * * * *